(12) United States Patent
Archer, Jr.

(10) Patent No.: US 7,531,210 B1
(45) Date of Patent: May 12, 2009

(54) METHOD OF DISTRIBUTING LINER ON INTERIOR OF TUBE

(75) Inventor: Harry L. Archer, Jr., Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 626 days.

(21) Appl. No.: 11/169,258

(22) Filed: Jun. 23, 2005

(51) Int. Cl.
*B05D 7/22* (2006.01)
(52) U.S. Cl. ...................................... 427/231
(58) Field of Classification Search ........................ None
See application file for complete search history.

(56) References Cited

U.S. PATENT DOCUMENTS

| | | | |
|---|---|---|---|
| 3,692,457 | A | * 9/1972 | Pekor .......................... 425/435 |
| 4,131,051 | A | 12/1978 | Schaffling |
| 4,185,557 | A | 1/1980 | Gerrish et al. |
| 4,736,684 | A | 4/1988 | Byrd et al. |
| 4,803,019 | A | 2/1989 | Graham et al. |
| 4,821,511 | A | 4/1989 | Felix et al. |
| 5,767,221 | A | 6/1998 | Poulter et al. |

\* cited by examiner

*Primary Examiner*—William Phillip Fletcher, III
(74) *Attorney, Agent, or Firm*—Fredric J. Zimmerman (57) ABSTRACT

A method of uniformly distributing liner on an interior of a tube includes providing an apparatus comprising a horizontal bed, a tailstock coupling mounted on the horizontal bed, a drive coupling and a drive unit connected to the drive coupling; mounting the tube in the tailstock and drive couplings; and spinning the tube using torque control of the drive unit. In one embodiment, the method includes dispensing a continuous bead of liner on the interior of the tube and spreading the liner on the interior of the tube using a brush.

19 Claims, 13 Drawing Sheets

METHOD OF DISTRIBUTING LINER ON INTERIOR OF TUBE

STATEMENT OF GOVERNMENT INTEREST

The invention described herein may be manufactured and used by or for the Government of the United States of America for government purposes without the payment of any royalties thereof.

BACKGROUND OF THE INVENTION

The invention relates in general to devices for spinning hollow, cylindrical tubes and in particular to devices for spinning rocket motor tubes to distribute, evenly, viscous liner material deposited on the interior of the tube.

Rocket motor tubes are lined with a fire retardant liner to prevent the propellant from burning through the tube wall. The rocket tubes are, for example, about three feet long and two to three inches in diameter. U.S. patent application Ser. No. 10/927,647 filed on Aug. 25, 2004, entitled "Apparatus For Applying Liquid Liner To Rocket Tube," having the same inventor as the present application, discloses an apparatus for dispensing a continuous bead of liner into a rocket motor tube. The contents of the above noted previous application are hereby expressly incorporated by reference.

After depositing the continuous bead of liner in the rocket tube, the liner must be spread around to cover the interior of the rocket tube. U.S. patent application Ser. No. 10/985,064 filed on Nov. 10, 2004 entitled "Apparatus for Spreading Liquid Liner in Rocket Tube," having the same inventor as the present application, discloses a brushing apparatus for spreading viscous liner over the interior of a rocket motor tube. The contents of the above noted previous application are hereby expressly incorporated by reference.

After the brushing operation that spreads the liner, the present invention is used to spin the tubes to uniformly distribute the liner on the interior of the tube. The spinning operation uses centrifugal force to form a uniform layer of liner on the interior of the tube.

SUMMARY OF THE INVENTION

The invention includes a torque control method for controlling an apparatus for spinning hollow, cylindrical tubes that may be balanced or unbalanced. The hollow cylindrical tubes may be, for example, rocket motor tubes. The interiors of the rocket motor tubes are coated with a viscous liner material. Initially, the viscous liner material is not evenly distributed on the interior of the rocket motor tubes. The purpose of spinning the rocket motor tubes is to distribute, evenly, the viscous liner on the interior of the tubes by a centrifugal force of spinning. The drive motor for the spinning apparatus is torque controlled, rather than speed controlled. With torque control, it is easier to achieve generally constant speed spinning with an unbalanced load.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE EMBODIMENTS

FIGS. 1, 2, 12 and 13 are perspective views of one embodiment of a spinning apparatus (spinner) 10 in accordance with the invention. The spinner 10 shown in FIGS. 1, 2, 12 and 13 is designed to accommodate two tubes at a time. It is noted however, that the spinner 10 shown in is merely exemplary and other spinners that accommodate fewer or more tubes are within the scope of the invention.

Spinner 10 is mounted on a table 12 or other stable and sturdy horizontal surface. Spinner 10 includes an adjustable bed 14, guard cover 16, manual locking clamps 18, tailstock bearings 20, tailstock coupling 22, drive coupling 24 and drive unit 26. Drive couplings 24 are only partially visible in FIG. 1 because of splatter shields 28 installed around drive couplings 24. In an exemplary embodiment, drive unit 26 is torque-controlled. Drive unit 26 comprises a torque-controlled electric motor 122 with associated control components. As an alternative to an electric motor, an air motor with regulator may be used for the drive unit 26.

Figure 12:
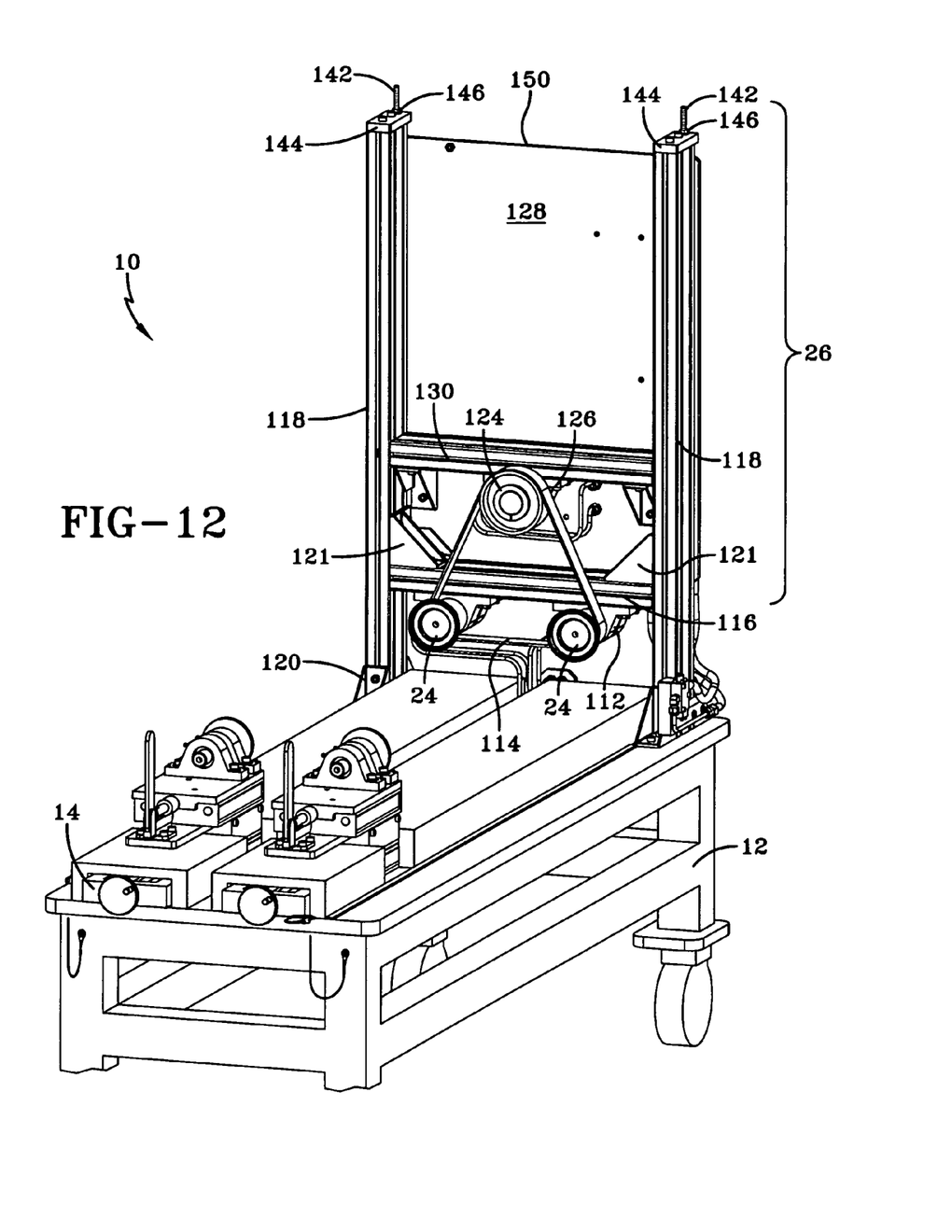
FIG. 12 is a front perspective view of the spinning apparatus.
Figure 13:
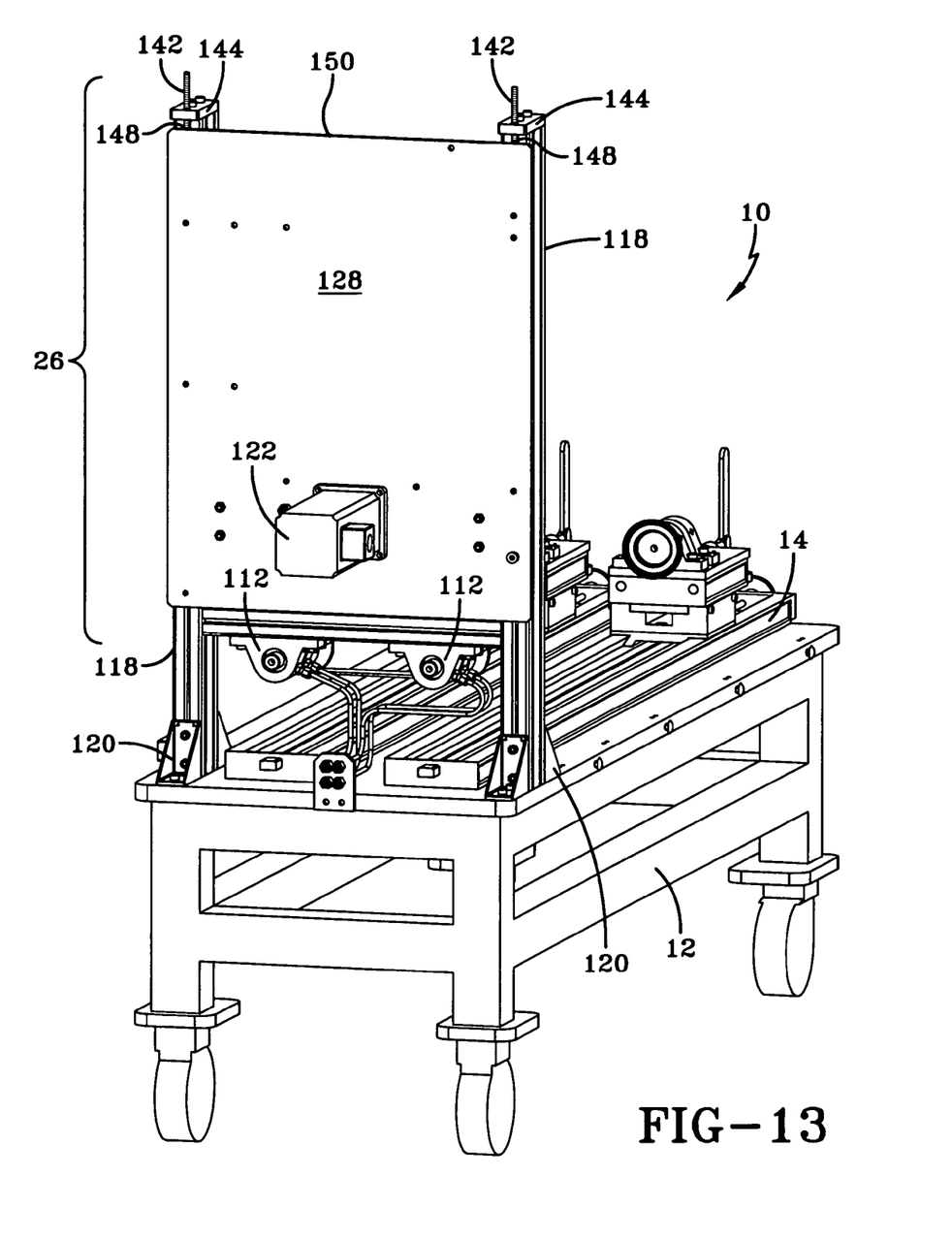
FIG. 13 is a rear perspective view of the spinning apparatus.

Referring to FIGS. 12 and 13, one or more drive coupling bearings 112 are mounted on the drive coupling support strut 116. Each drive coupling 24 is supported by a set of drive coupling bearings 112. Drive unit 26 comprises, among other components, a drive motor 122; a drive pulley 124 connected to the drive motor 122; drive pulley bearings 126 mounted on the drive unit strut 130; and a belt 114 connecting the drive pulley 124 and the drive couplings 24. Where more than two drive couplings 24 are used, the belt 114 would connect couplings 24 and drive pulley 124 in a known serpentine manner.

Motor torque is controlled by, for example, computer software or one or more appropriate hard wired controller(s). Motor speed is controlled by the balance between motor output torque and bearing friction resistance torque. In the embodiment shown, the bearing friction is supplied by tailstock bearings 20, drive coupling bearings 112 and drive pulley bearings 126. The drive motor 122 rotational speed equals a tube 40 rotational speed. Motor speed is proportional to the amount of drag in the bearing drive system. The greater the bearing drag, the lower the steady state speed. The lower the bearing drag, the higher the steady state speed.

As the motor rpm increases, the bearing friction increases due to bearing grease shear and/or tube 40 vibration, until bearing friction matches motor torque. When bearing friction equals motor torque, the rotational speed becomes approximately constant. Rotational speed should be, for example, in a range of about 3000 rpm to about 4000 rpm. If no tube 40 is mounted in the spinner, the motor may overspeed and automatically shut down by using the appropriate overspeed detection circuits. Motor overspeed occurs at, for example, about 5000 rpm. Spinning time is in general about ten seconds to about sixty seconds.

Figure 1:
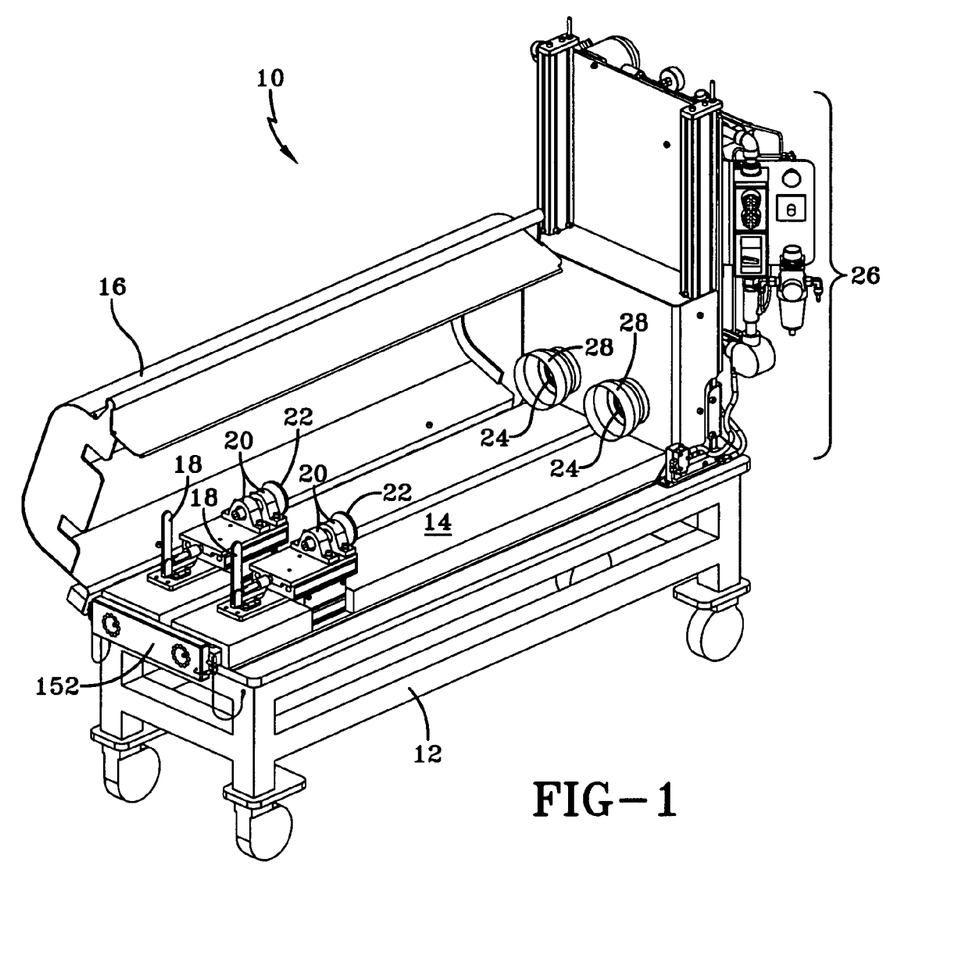
FIGS. 1 and 2 are perspective views of one embodiment of a spinning apparatus in accordance with the invention.
Figure 2:
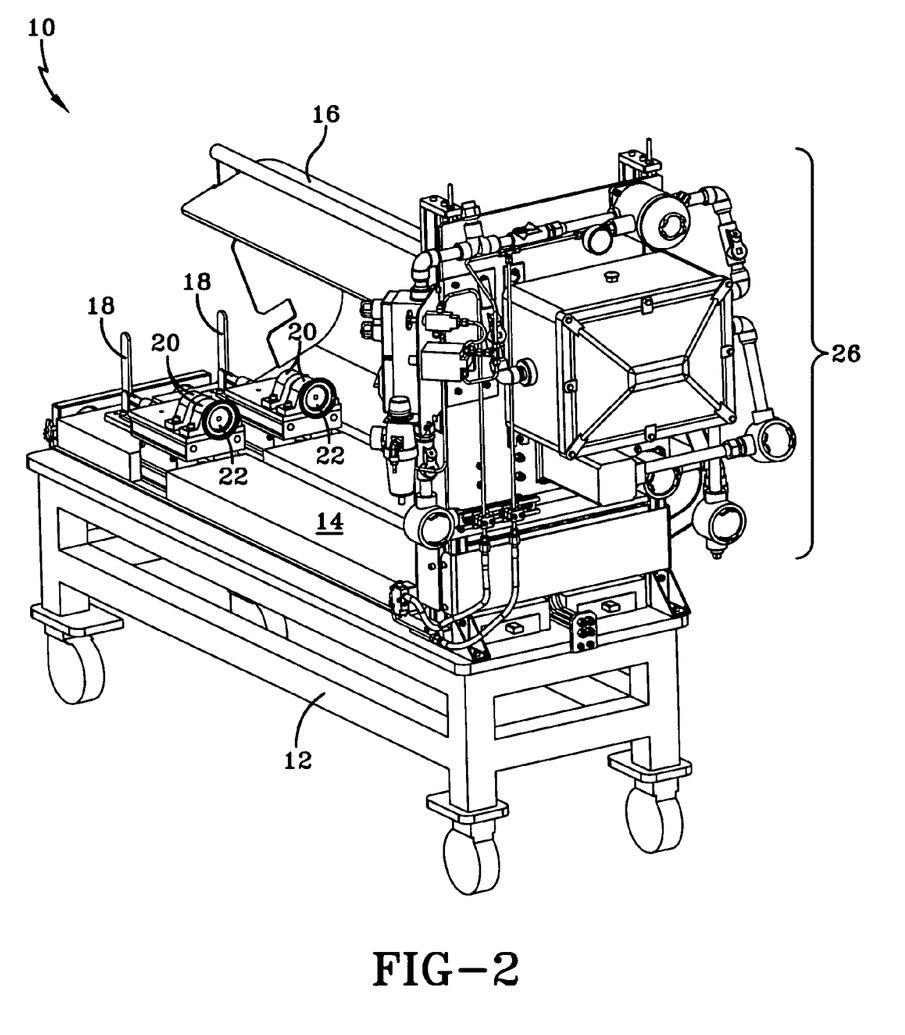
Figure 3:
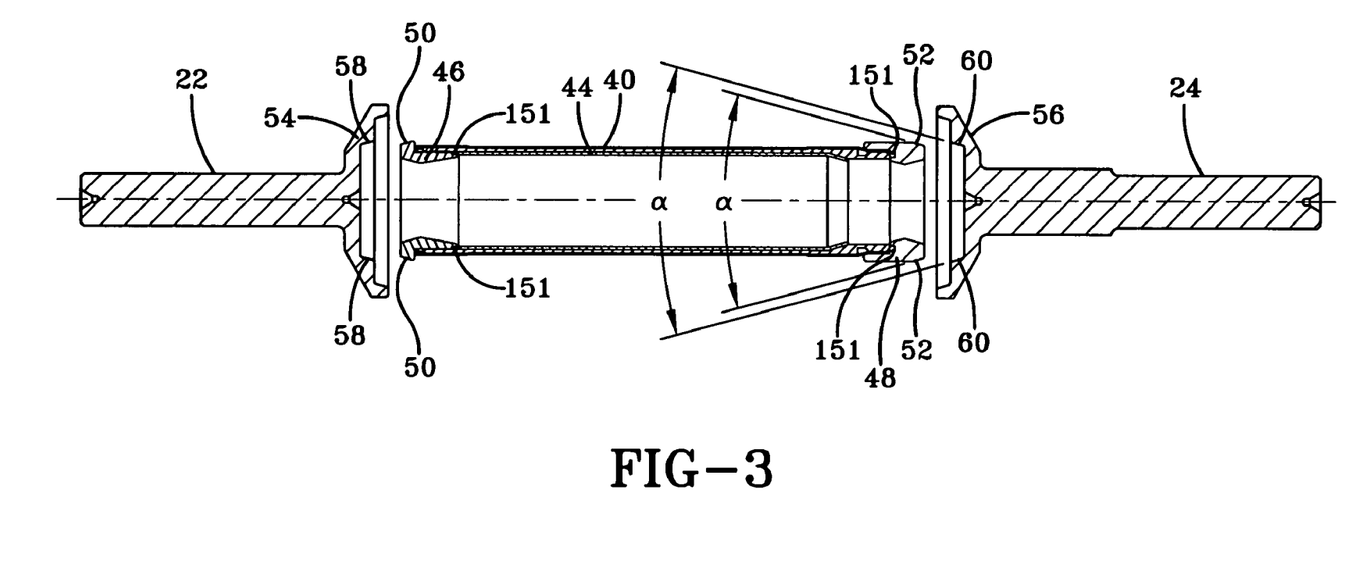
FIGS. 3 and 4 are cross-sectional views of rocket motor tubes with masks.
Figure 4:
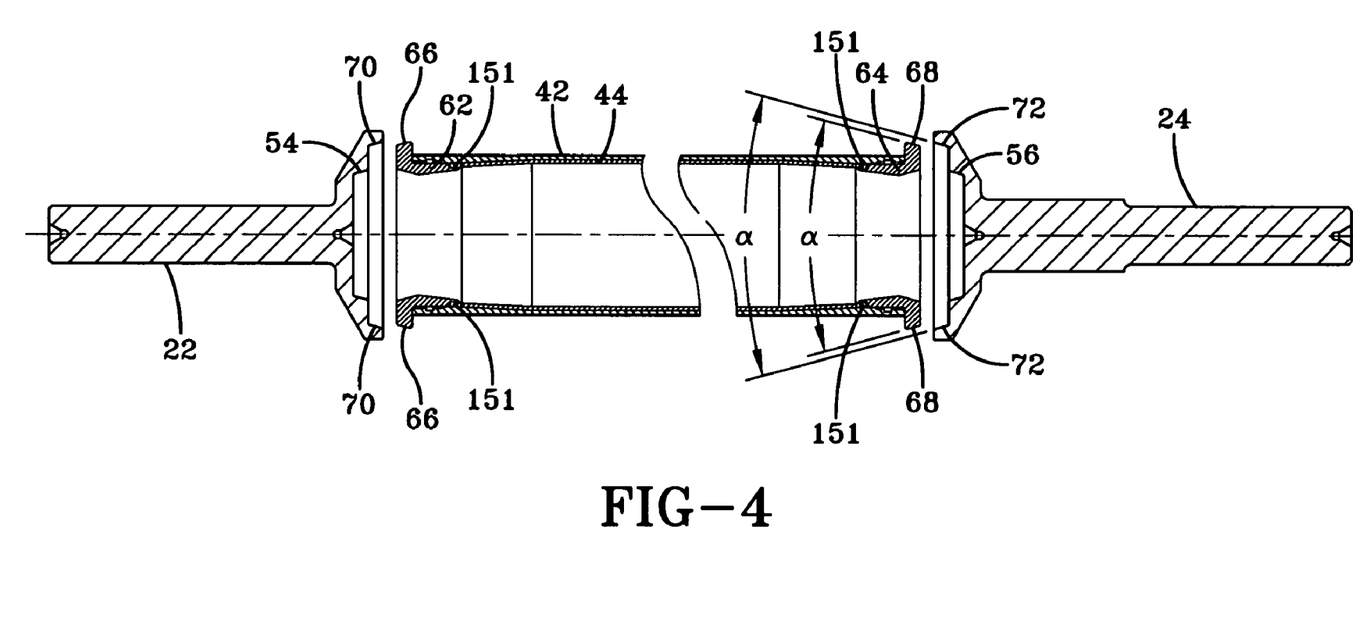

FIGS. 3 and 4 are cross-sectional views of rocket motor tubes with masks showing how masks 46, 48 couple with the tailstock and drive couplings 22, 24. FIG. 3 shows a rocket motor tube 40 of the small class. The interior of tube 40 has a coating of viscous liner 44. Generally, the viscous liner 44 has been applied to tube 40 and brushed using the apparatuses disclosed in co-pending patent application Ser. Nos. 10/927,647 and 10/985,064, referenced and incorporated above. The liner 44, although applied on the interior of tube 40, is not sufficiently evenly distributed. The purpose of the spinning apparatus 10 is to evenly distribute liner 44 on the interior of tube 40. The tubes 40 spin, for example, at about 30004000 rpm until the liner inside the tube is evenly distributed.

As shown in FIG. 3, tube 40 includes mask 46 at the tailstock end and mask 48 at the drive end. Each of masks 46, 48 includes angled surfaces 50, 52 and O-ring 151. O-rings 151 are situated substantially adjacent masks 46, 48 of the tube 40. The O-rings perform several over functions in addition to being a structural interface between the masks 46, 48 and the tube 40. O-rings 151, when installed under compression, prevent liner 44 from entering the areas of the tube 40 adjacent the masks 46, 48 (masking function). O-rings 151 help center the tube 40 during the spinning operation and also transfer torque from the mask 52 at the drive end to the tube 40.

Tailstock coupling 22 includes a flanged portion 54 having interior angled surface 58. Drive coupling 24 includes a flanged portion 56 having interior angled surface 60. When tube 40 is in an operable position in spinner 10, angled surfaces 50, 52 of masks 46, 48 contact angled surfaces 58, 60 of the tailstock coupling 22 and the drive coupling 24, respectively. During the spinning operation, tailstock coupling 22 is stationary with mask 46 and tube 40 rotating against angled surface 58 of tailstock coupling 22. Drive coupling 24 rotates angled surface 60. Angled surface 60 drives angled surface 52 of mask 48. O-ring 151 of mask 48 drives tube 40. Couplings 22, 24 may be made of a metal, for example, stainless steel. Masks 46, 48 may be made of a plastic such as ultra high molecular weight polyethylene.

The angle of angled surfaces 58, 60 of the tailstock coupling and the drive coupling 22, 24 and the angle of the angled surfaces 50, 52 of the masks are substantially the same. For optimum operation, this angle alpha, as shown in FIG. 3, is in the range of about ten degrees to about forty-five degrees and, in particular, the angle alpha is about thirty degrees. Note that angle alpha corresponds to twice the angle between one of the angled surfaces 58, 60, 50, 52 and the central horizontal axis of the tube 40. That is, the angle between the angled surfaces 58, 60, 50, 52 and the central horizontal axis of the tube 40 is in the range of about five to about twenty-three degrees and, in particular, about fifteen degrees.

FIG. 4 shows a large class rocket motor tube 42 having masks 62, 64, drive coupling 24 and tailstock coupling 22. Masks 62, 64 include angled surfaces 66, 68, respectively and O-rings 151. O-rings 151 function in the same manner as described above with reference to FIG. 3. Drive coupling 24 includes angled surface 72 and tailstock coupler 22 includes angled surface 70. In a manner analogous to the embodiment of FIG. 3, angled surface 68 of mask 64 contacts angled surface 72 of drive coupling 24 and angled surface 66 of mask 62 contacts angled surface 70 of tailstock coupling 22. Because tailstock coupling 22 and drive coupling 24 each have small diameter angled surfaces 58, 60, respectively, and larger diameter angled surfaces 70, 72, respectively, the couplings are able to accommodate both small class and large class tubes.

In another embodiment, the couplings may be constructed with only the small or only the large size of angled surfaces. Such an embodiment would not be as versatile as the couplings shown in FIGS. 3 and 4. In general, different types of small class tubes may have some difference in diameter, but each small class tube will have individual masks with angled surfaces that will fit the angled surfaces 58, 60. Likewise, large class tubes may have differing diameters, but each large class tube will have individual masks with angled surfaces that will fit the angled surfaces 70, 72. In this manner, the use of standard size masks for each tube simplifies the connection to the couplings. In addition, the standard size masks cooperate with the apparatuses disclosed in copending application Ser. Nos. 10/927,647 and 10/985,064.

Figures 5, 6:
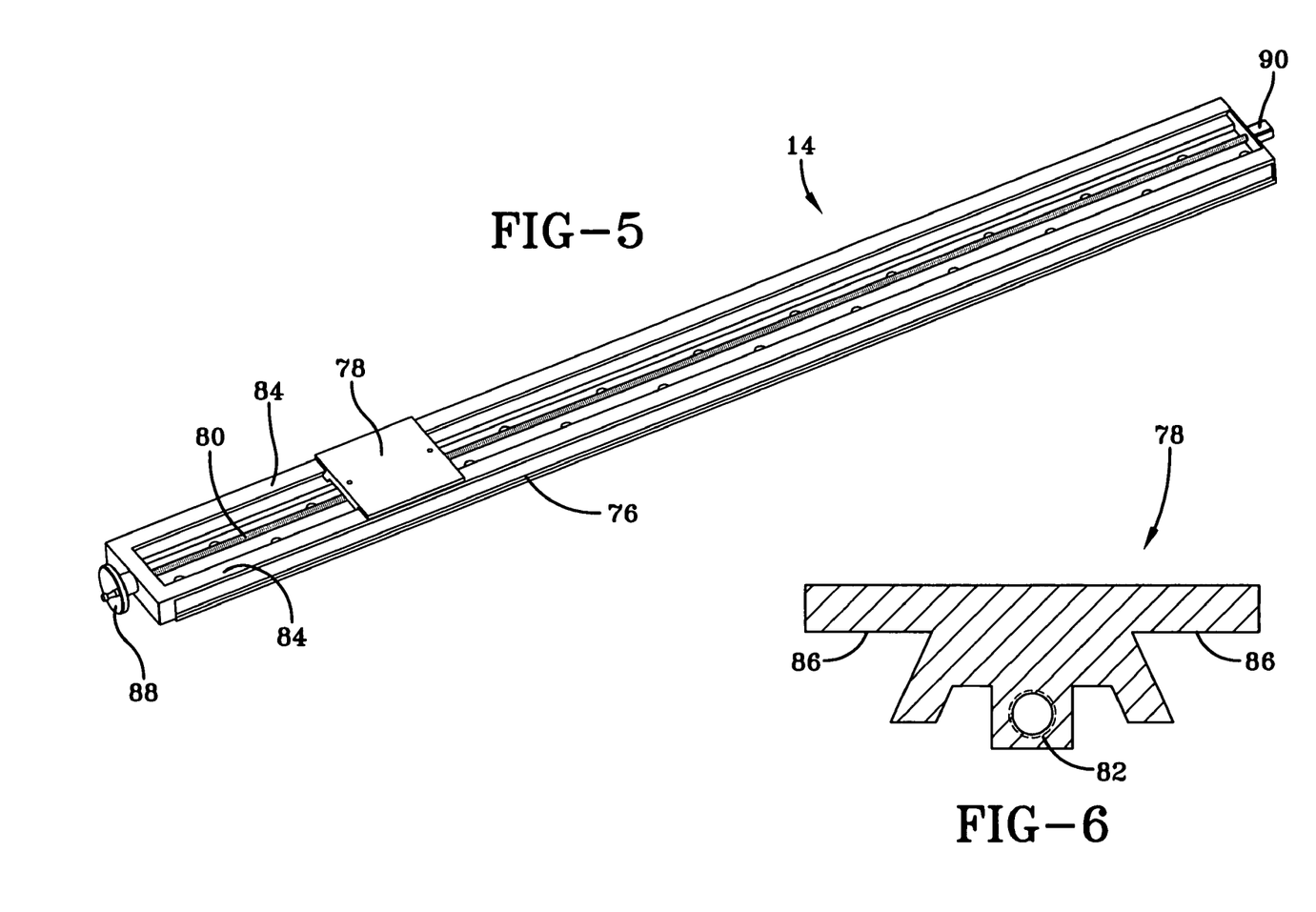
FIG. 5 is a perspective view of an adjustable bed.
FIG. 6 is a sectional view of a slide.

Each pair of drive and tailstock couplings 22, 24 is provided with an adjustable bed 14. Thus, in the embodiment of the invention shown in FIGS. 1 and 2, there are two adjustable beds 14 shown with a way cover in place to prevent liner contamination. FIG. 5 is a perspective view of an adjustable bed 14 with no way cover. Bed 14 includes a bed housing 76, a slide 78 axially movable along the bed housing 76, an externally threaded rod 80, a turning knob 88 attached to one end of rod 80 and a digital indicator 90 attached to the other end of rod 80. Bed housing 76 includes top surfaces 84 upon which slide 78 axially moves. FIG. 6 is a sectional view of a slide 78. Slide 78 includes an internally threaded bushing 82 that threadingly engages rod 80 and through which rod 80 passes. Bottom surfaces 86 of slide 78 slide on the top surfaces 84 of bed housing 76. Thus, by rotating turn knob 88, slide 78 may be positioned axially at any point along bed housing 76.

When loading a rocket motor tube into the spinner 10, the bed 14 is adjusted to a length of the rocket motor tube by rotating turn knob 88 until digital indicator 90 indicates a numeral corresponding to the length of the rocket motor tube. Because the tailstock assembly is fixed to the top of slide 78 (as discussed in more detail below), the tailstock coupling 22 will then be in the proper position for loading the tube. A locking cover 152 (FIG. 1) may be used to lock the turning knob 88 in place to prevent any unwanted axial movement of the slide 78 during operation of the spinner 10.

Figure 7:
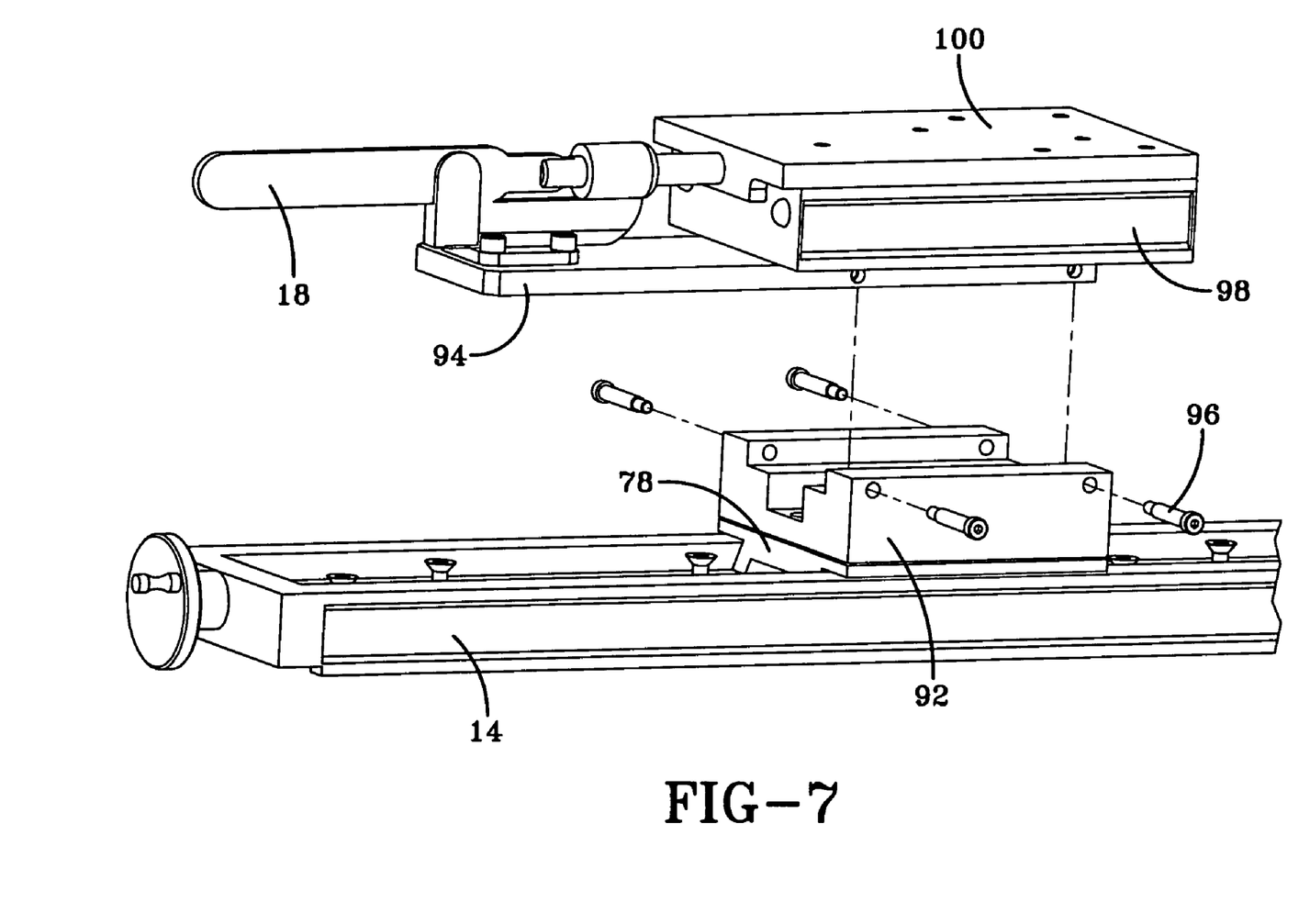
FIG. 7 is an exploded view of a portion of the tailstock assembly.

FIG. 7 is an exploded view of a portion of the tailstock assembly. Tailstock assembly comprises a mount block 92 fixed to the top of the slide 78 by, for example, bolts or screws. A locking clamp support plate 94 is fixed to the top of the mount block 92 by bolts or screws 96. Locking clamp 18 is fixed to the top of the locking clamp support plate 94 by bolts or screws. A shuttle slide 98 is mounted on top of the locking clamp support plate 94. A shuttle plate 100 is fixed to the top of the shuttle slide 98. Bearings 20 (not shown in FIG. 7) are mounted on the top of shuttle plate 100. Tailstock coupling 22 is supported in bearings 20.

Figure 8:
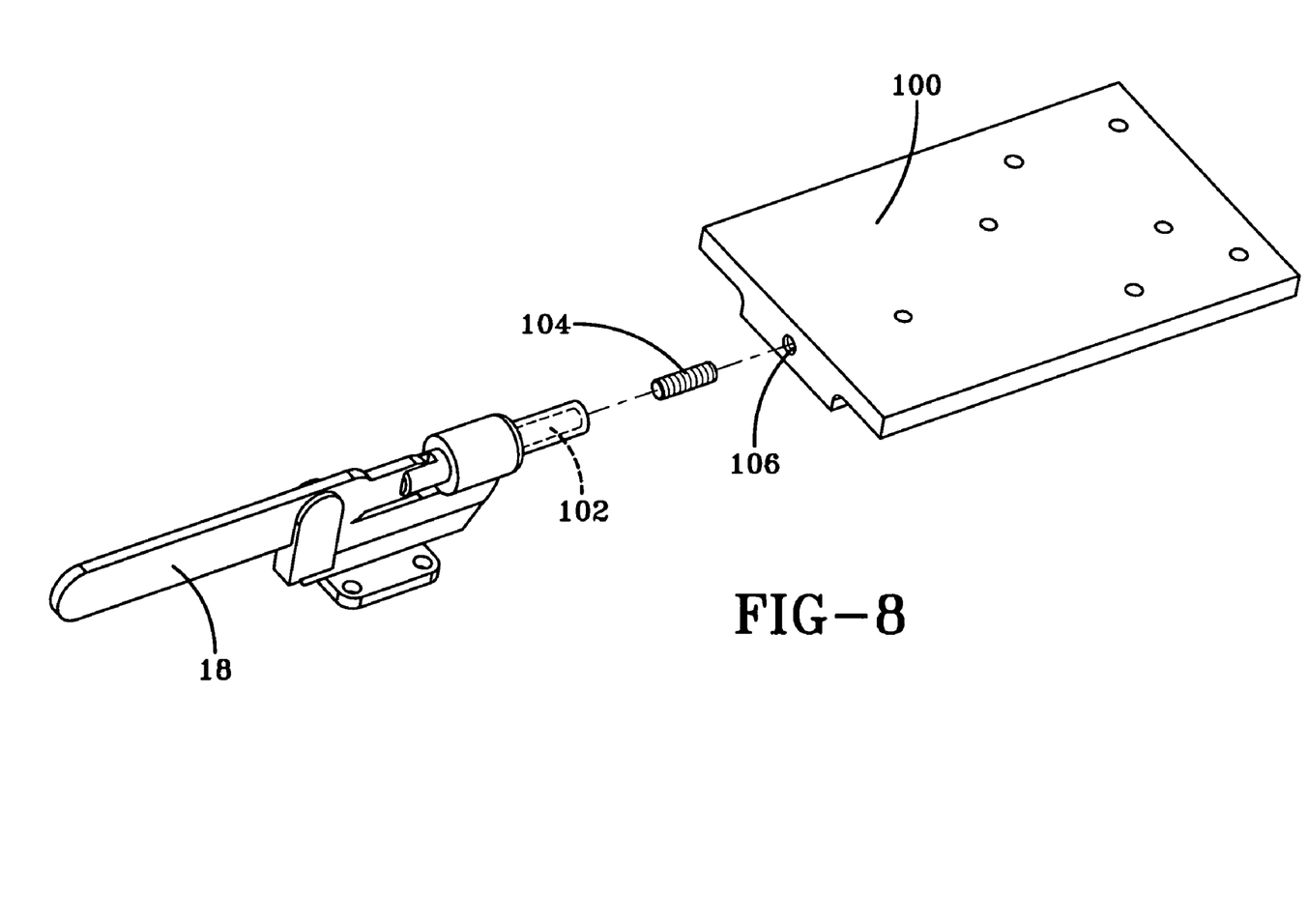
FIG. 8 shows the connection between a locking clamp and a shuttle plate.

As shown in more detail in FIG. 8, the locking clamp 18 is connected to the shuttle plate 100 by, for example, a threaded stud 104 that threads into opening 106 in shuttle plate 100 and threads into tapped hole 102 in locking clamp 18. Shuttle slide 98, shown in more detail in FIG. 9, allows locking clamp 18 to move the shuttle plate 100 relative to the locking clamp support plate 94.

Figure 9:
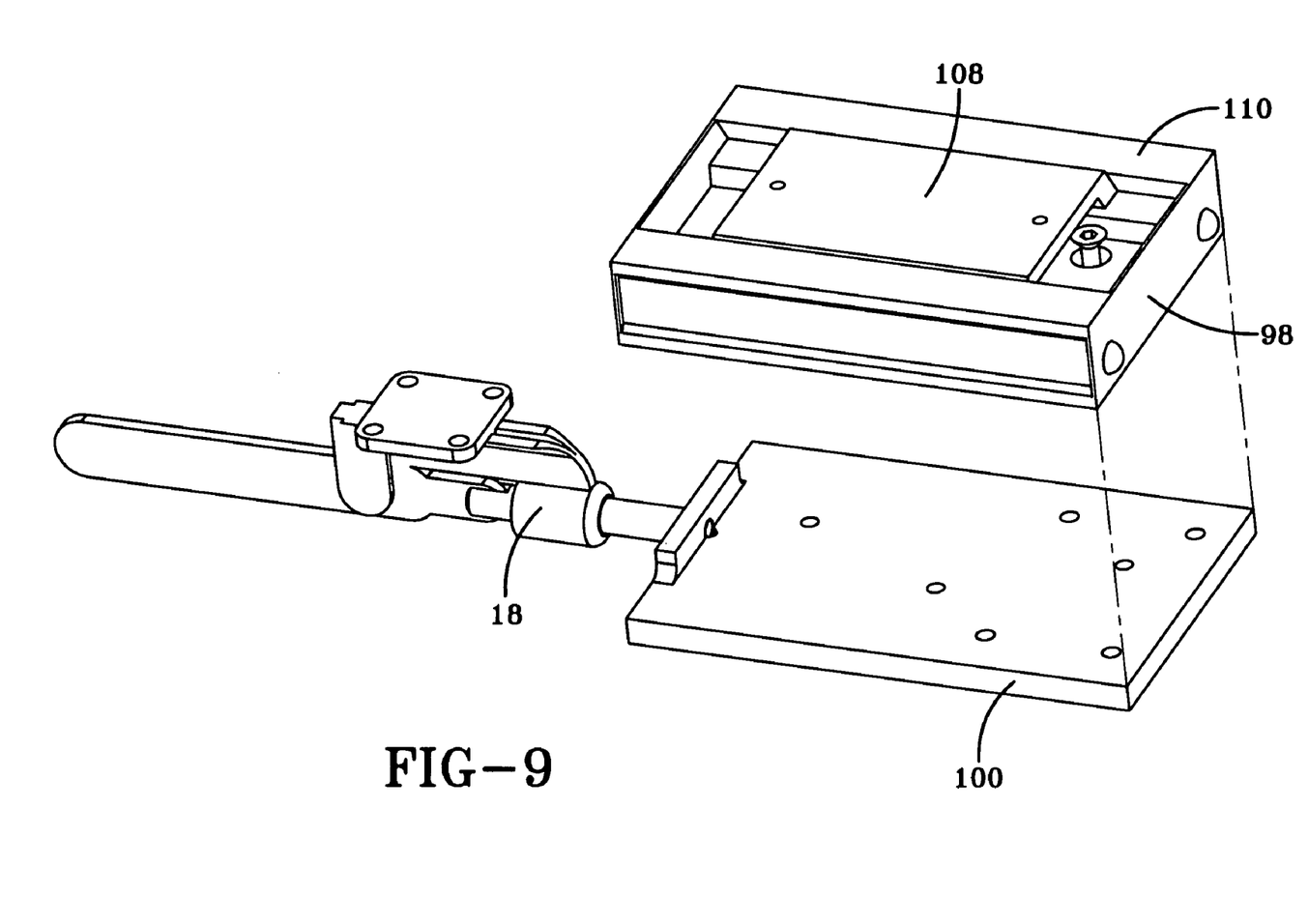
FIG. 9 is an upside down perspective view showing the shuttle slide, shuttle plate and locking clamp.
Figure 10:
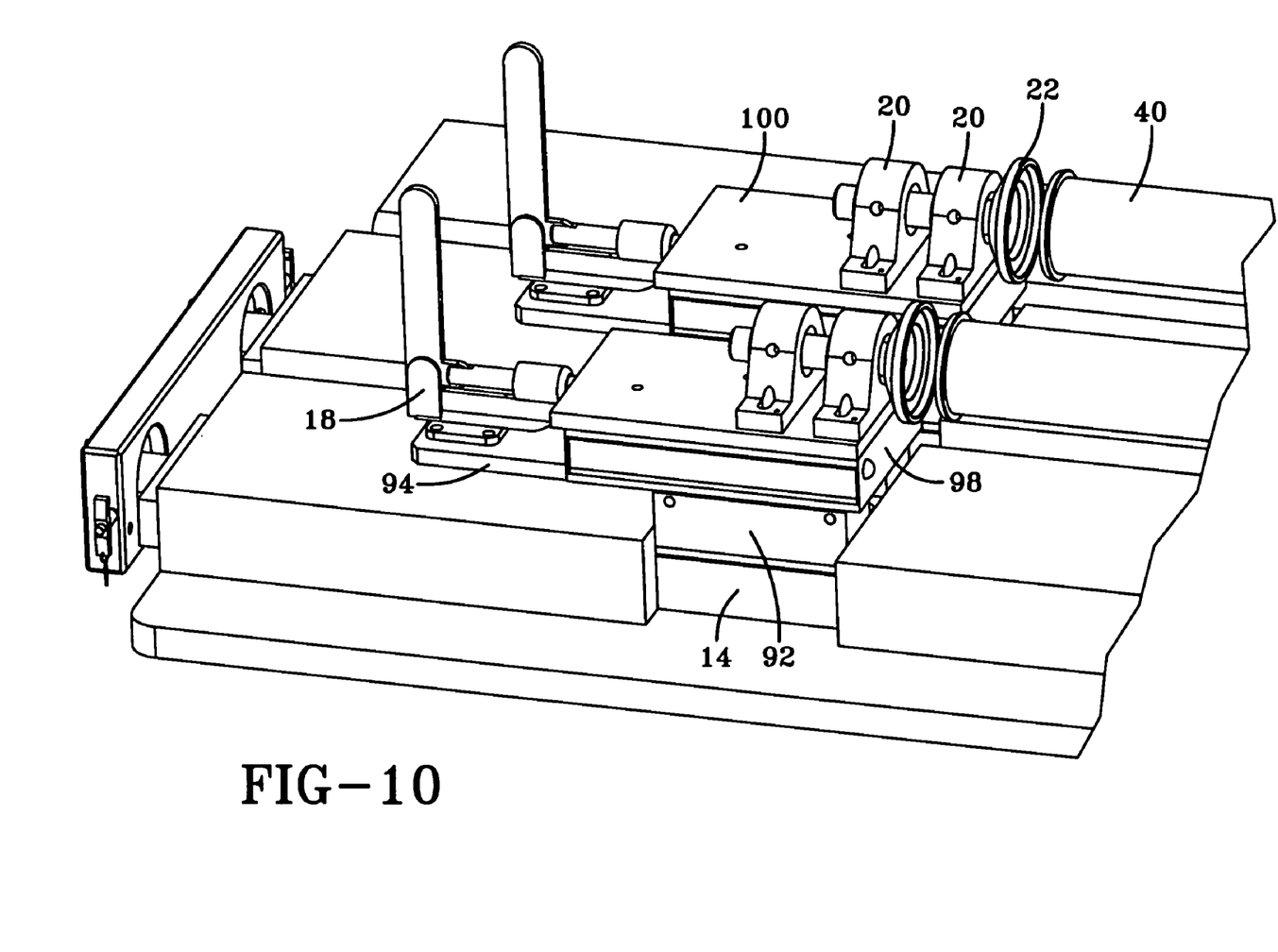
FIG. 10 shows the locking clamp in an unlocked or open position.
Figure 11:
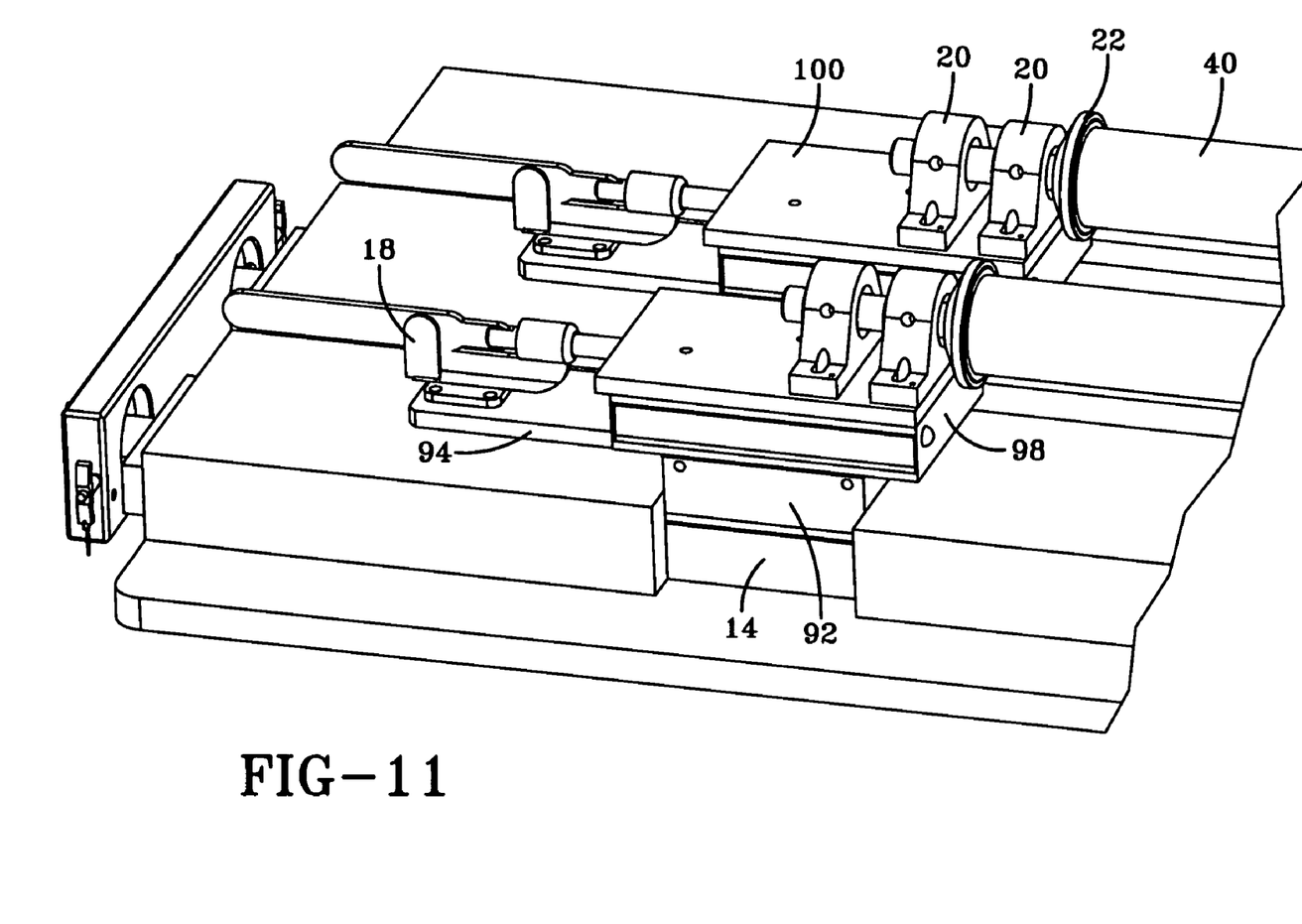
FIG. 11 shows the locking clamp in a locked or closed position.

FIG. 9 is an upside down perspective view showing the shuttle slide 98, shuttle plate 100 and locking clamp 18. Shuttle slide 98 comprises a slide portion 108 that is fixed to the top of the locking clamp support plate 94 (not shown in FIG. 9) and a housing portion 110 that is movable with respect to the slide portion 108. Slide portion 108 has a dovetail fit in housing portion 110 that allows the housing portion 110 and slide portion 108 to move axially relative to each other. The housing portion 110 is fixed to the shuttle plate 100. Thus, when locking clamp 18 is moved from the unlocked position, as shown in FIG. 10, to the locked position, as shown in FIG. 11, the shuttle plate 100 with bearings 20 and tailstock coupling 22 attached, is moved towards the rocket motor tube 40 to lock it in place for spinning.

FIG. 12 is a front perspective view of the spinner 10 and FIG. 13 is a rear perspective view of the spinner 10. Some components of the spinner 10 are not shown in FIGS. 12 and 13 so that the drive and belt tensioning features may be more clearly shown and described. Adjustable, horizontal bed(s) 14 rest on a horizontal surface such as the top of table 12. A pair of vertical struts 118 are attached to the horizontal surface using, for example, brackets 120. A drive coupling support strut 116 is mounted between the pair of vertical struts 118 using, for example, brackets 121. One or more drive coupling bearings 112 are mounted on the drive coupling support strut 116. Each drive coupling 24 is supported by a set of drive coupling bearings 112.

Drive unit 26 comprises, among other components, a drive unit support plate 128 attached to the vertical struts 118; a drive unit strut 130 attached to the drive unit support plate 128 (using brackets, for example) and disposed between vertical struts 118; a drive motor 122 attached to the drive unit support plate 128; a drive pulley 124 connected to the drive motor 122; drive pulley bearings 126 mounted on the drive unit strut 130; and a belt 114 connecting the drive pulley 124 and the drive couplings 24. Where more than two drive couplings 24 are used, the belt 114 would connect couplings 24 and drive pulley 124 in a known serpentine manner.

Figure 14:
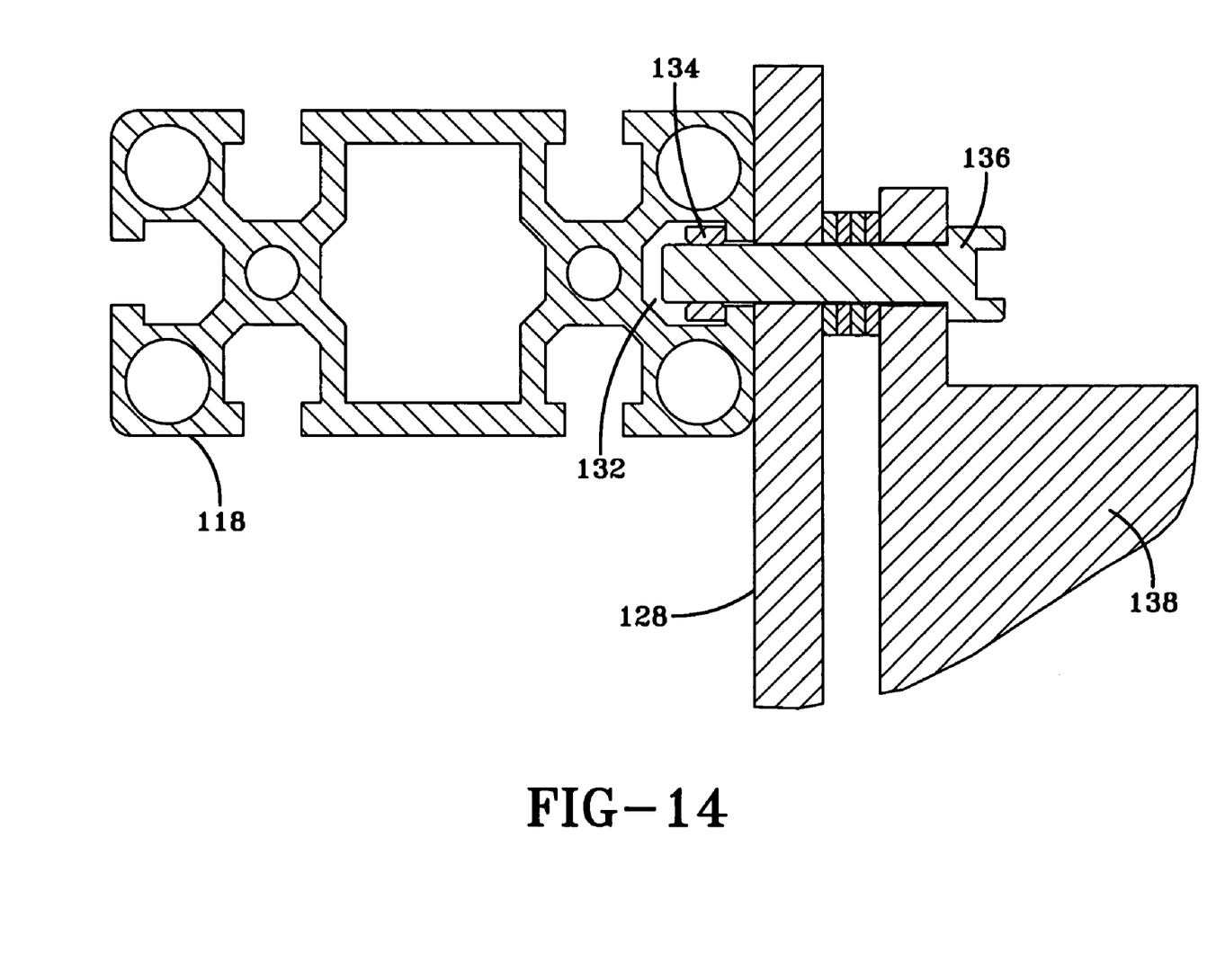
FIG. 14 is a cross-section of a vertical strut.

FIG. 14 is a cross-section of a vertical strut 118. Each vertical strut 118 includes a generally T-shaped vertical channel 132 formed therein. Six generally T-shaped vertical channels are shown in FIG. 14, however, for the present invention, only one channel 132 is necessary. Disposed in channel 132 are nuts 134 placed at vertical intervals. Bolts 136 are inserted through the drive unit support plate 128 and into respective ones of the nuts 134 to thereby secure the drive unit support plate 128 to the vertical struts 118. Bolts 136 may be directly secured to the drive unit support plate 128, or, as shown in FIG. 14, bolts 136 may also directly support a control component 138 situated on support plate 128.

Drive unit support plate 128 (FIGS. 12 and 13) includes two threaded holes 148 (FIG. 13) in a top edge 150. A tension plate 144 is fixed to a top of each vertical strut 118. Each tension plate 144 has an opening therein for receiving a threaded stud 142. Stud 142 passes through the opening in the tension plate 144 and threads into hole 148 in the top edge 150 of the drive unit support plate 128. Alternatively, stud 142 may be, for example, welded, bonded or machined as part of the drive unit support plate 128. A nut 146 (FIG. 12) is disposed on a top of each tension plate 144. The nuts 146 engage the studs 142. By first loosening bolts 136 (FIG. 14) that attach support plate 128 to struts 118, one may adjust the vertical position of the drive unit support plate 128 by simply rotating nuts 146. This action allows gravity to lower the drive unit support plate 128. Vertical adjustment of the drive unit support plate 128 adjusts the tension in belt 114.

While the invention has been described with reference to certain embodiments, numerous changes, alterations and modifications to the described embodiments are possible without departing from the spirit and scope of the invention as defined in the appended claims, and equivalents thereof.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A method of distributing liner on an interior of a tube, comprising:
    providing an apparatus comprising a horizontal bed, a tailstock coupling being mounted on the horizontal bed, a drive coupling and a drive unit being connected to the drive coupling;
    mounting the tube in the tailstock and drive couplings; and
    spinning the tube using the drive unit,
        wherein the drive unit comprises a torque-controlled motor,
        wherein said tube comprises a plurality of masks, and
        wherein said plurality of masks comprises O-rings and angled surfaces.

2. The method of claim 1, wherein said spinning includes spinning the tube at a speed in a range of about 3000 to about 4000 rpm.

3. The method of claim 1, wherein said spinning includes spinning the tube for a time period of about ten seconds to about sixty seconds.

4. The method of claim 1, further comprising dispensing, a continuous bead of liner on the interior of the tube.

5. The method of claim 4, further comprising spreading the liner on the interior of the tube using a brush.

6. The method of claim 1, wherein the drive unit comprises a torque-controlled motor.

7. The method of claim 1, further comprising controlling motor speed of said drive unit by balancing motor output torque and bearing friction resistance torque.

8. The method of claim 7, further comprising supplying said bearing friction resistance torque by tailstock bearings, drive coupling bearings and drive pulley bearings.

9. The method of claim 7, wherein said bearing friction resistance torque comprises at least one of bearing grease shear and tube vibration.

10. A method of distributing liner on an interior of a tube, comprising:
    providing an apparatus comprising a horizontal bed, a tailstock coupling being mounted on the horizontal bed, bearings for supporting the tailstock coupling, a drive coupling, bearings for supporting the drive coupling, and a drive unit being connected to the drive coupling;
    mounting the tube in the tailstock and the drive couplings;
    spinning the tube using the drive unit,
        wherein the drive unit comprises a torque-controlled motor;
    generating friction in the bearings for supporting the tailstock coupling and the bearings for supporting the drive coupling to balance output torque of the drive unit, and
    centering said tube during said spinning by O-rings being situated substantially adjacent masks of said tube and transferring torque to an end of said tube by said O-rings.

11. The method of claim 10, wherein spinning includes spinning the tube at a speed in a range of about 3000 to about 4000 rpm.

12. The method of claim 10, wherein spinning includes spinning the tube for a time period of about ten seconds to about sixty seconds.

13. The method of claim 10, further comprising dispensing a continuous bead of liner on the interior of the tube.

14. The method of claim 10, further comprising spreading the liner on the interior of the tube using a brush.

15. The method of claim 10, wherein said drive coupling comprises a first angled surface and a first angle,
   wherein said tailstock coupling comprises a second angled surface and a second angle, and
   wherein said first angle and said second angle are substantially equal angles.

16. The method of claim 10, wherein said substantially equal angles are in a range of about ten degrees to about forty-five degrees.

17. A method of distributing liner on an interior of a tube, comprising:
   dispensing a continuous bead of liner on the interior of the tube;
   spreading the liner on the interior of the tube using a brush;
   providing an apparatus comprising a horizontal, adjustable bed, the bed including a bed housing and a slide movably disposed in the bed housing, a tailstock assembly fixed to a top of the slide,
      wherein the tailstock assembly comprises a tailstock coupling, first bearings support the tailstock coupling and a locking clamp moves the tailstock coupling and said first bearings relative to the slide, a drive coupling, second bearings support the drive coupling, and a drive unit connected to the drive coupling;
   mounting the tube in the tailstock and the drive couplings;
   spinning the tube using of the drive unit,
      wherein the drive unit comprises a torque-controlled motor; and
   generating friction in the first bearings for supporting the tailstock coupling and the second bearings for supporting the drive couplings to balance output torque of the drive unit,
      wherein the tailstock assembly further comprises a mount block fixed to the top of the slide, a locking clamp support plate fixed to a top of the mount block, the locking clamp fixed to a top of the locking clamp support plate, a shuttle slide mounted on top of the locking clamp support plate and a shuttle plate fixed to a top of the shuttle slide, and
      wherein the locking clamp is connected to an end of the shuttle plate for moving the shuttle plate relative to the locking clamp support plate.

18. The method of claim 17, wherein the spinning includes spinning the tube at a speed in a range of about 3000 to about 4000 rpm.

19. The method of claim 17, wherein the spinning includes spinning the tube for a time period of about ten seconds to about sixty seconds.

* * * * *